(12) United States Patent
Takano (10) Patent No.: US 8,963,832 B2
(45) Date of Patent: Feb. 24, 2015

(54) MOBILE TERMINAL

(75) Inventor: Satoshi Takano, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 156 days.

(21) Appl. No.: 13/582,693

(22) PCT Filed: Mar. 3, 2011

(86) PCT No.: PCT/JP2011/054929
§ 371 (c)(1),
(2), (4) Date: Sep. 24, 2012

(87) PCT Pub. No.: WO2011/108650
PCT Pub. Date: Sep. 9, 2011

(65) Prior Publication Data
US 2013/0009910 A1 Jan. 10, 2013

(30) Foreign Application Priority Data
Mar. 5, 2010 (JP) .................................. 2010-049420

(51) Int. Cl.
G06F 3/044 (2006.01)
G06F 3/0481 (2013.01)
G06F 3/0488 (2013.01)

(52) U.S. Cl.
CPC ............ *G06F 3/044* (2013.01); *G06F 3/04817* (2013.01); *G06F 3/0488* (2013.01); *G06F 2203/04101* (2013.01); *H04M 2250/12* (2013.01); *H04M 2250/22* (2013.01)
USPC ............................ 345/156; 345/173; 345/661

(58) Field of Classification Search
CPC ..................................................... G06F 3/044
USPC ........... 345/156, 173, 661, 619, 522; 715/764
See application file for complete search history.

(56) References Cited

U.S. PATENT DOCUMENTS

2009/0153517 A1* 6/2009 Liu et al. .................. 345/173
2009/0289914 A1* 11/2009 Cho ........................... 345/173
2013/0314106 A1* 11/2013 Gecnuk ...................... 324/672

FOREIGN PATENT DOCUMENTS

CN 101458584 A 6/2009
JP 5-046308 A 2/1993
(Continued)

OTHER PUBLICATIONS

International Preliminary Report on Patentability issued on Oct. 2, 2012 in PCT/JP2011/054929.
(Continued)

*Primary Examiner* — Abbas Abdulselam
*Assistant Examiner* — Shawna Stepp Jones
(74) *Attorney, Agent, or Firm* — Sughrue Mion, PLLC (57) ABSTRACT

In a mobile terminal of the present invention, when the finger of a user is approaching a touch panel, an estimation coordinate as a position of the finger and an estimation distance as a distance between the finger and the touch panel are determined based on a capacitance value between the finger and the touch panel, and capacitance distribution data showing a distribution of the capacitance values is generated. When the capacitance distribution data is similar to set capacitance distribution data, an object icon, which is arranged in the estimation coordinate, of a plurality of icons displayed on the touch panel is displayed on the touch panel in a size larger than in a basic size. In this way, only when detecting that the finger of the user is approaching the touch panel, the icon which is displayed on the touch panel is displayed in an expansion state. Therefore, a malfunction can be prevented and the improvement of operability can be attempted to the user.

8 Claims, 10 Drawing Sheets

(56) References Cited

FOREIGN PATENT DOCUMENTS

| | | |
|---|---|---|
| JP | 8-212005 A | 8/1996 |
| JP | 10-240435 A | 9/1998 |
| JP | 11-065769 A | 3/1999 |
| JP | 2007-004660 A | 1/2007 |
| JP | 2006-236143 A | 9/2008 |
| JP | 2008-217704 A | 9/2008 |
| JP | 2009-086612 A | 4/2009 |

OTHER PUBLICATIONS

Communication dated Oct. 10, 2014 from the State Intellectual Property Office of P.R. China in counterpart application No. 201180012658.9.

* cited by examiner

MOBILE TERMINAL

CROSS REFERENCE TO RELATED APPLICATIONS

This application is a National Stage of International Application No. PCT/JP2011/054929 filed Mar. 3, 2011, claiming priority based on Japanese Patent Application No. 2010-049420, filed Mar. 5, 2010, the contents of all of which are incorporated herein by reference in their entirety.

TECHNICAL FIELD

The present invention is related to a mobile terminal which is provided with a touch panel.

BACKGROUND ART

A mobile terminal which is a portable type computer has been developed. This mobile terminal displays a plurality of icons, which can be selected by a user, on a display section. The user operates an operation section to select a desired icon from among the plurality of icons displayed on the display section. The mobile terminal displays the contents of the selected icon on the display section.

In recent years, the mobile terminal for which a touch panel of a capacitance type is provided instead of the display section has been developed. In the mobile terminal, the user can select a desired icon from among a plurality of icons by touching the touch panel with a finger. Because the mobile terminal has been miniaturized, the size of the touch panel which is provided for the mobile terminal is restrained. On the other hand, if the icons to be displayed once on the touch panel increase more, the user can select the desired icon the less number of times.

Also, when the touch panel of the capacitance type is provided for the mobile terminal, a plurality of transparent electrodes of linear sensors and so on are arranged on the touch panel in the pitch of about 5 mm. In this case, the mobile terminal detects the capacitance values of the capacitances formed between the plurality of transparent electrodes and the finger when the finger touches the touch panel, and estimates the position of the finger. Therefore, it is difficult to specify the position of the finger on the touch panel and it is easy to cause an error. Thus, it is different from a method of selecting a position with a mouse, a stylus pen and so on. Also, a range of the icons on the panel which the can be selected through the touch is a part or its periphery of the displayed icon in many cases. When the displayed icon is small, it is difficult for the user to right select the icon.

Moreover, when the touch panel of the capacitance type is provided for the mobile terminal, it is general that the touch panel is touched with not a stylus pen but the finger. If the displayed icon is small, when the user tries to touch the touch panel, the desired icon can be concealed with the other fingers so that the desired icon can not be confirmed.

To prevent this problem, a technique which an object icon is displayed in an expanded state is described in JP 2009-86612A. In this technique, there is no detailed description of the position of an operation instructing section and a distance between a touch panel and of the operation instructing section. However, when the operation instructing section approaches the touch panel, the object icon of the plurality of icons which is displayed on the touch panel is displayed in an expansion state based on a capacitance value between the operation instructing section and the touch panel. Because the object icon is displayed in the expansion state when the operation instructing section approaches the touch panel, the improvement of operability can be attempted to the user and the user can handle it easily.

However, regardless of detecting a capacitance value between the operation instructing section and the touch panel, the operation instructing section may be a touch pen (a stylus pen) in addition to the finger. Therefore, when an object which is not the finger and the touch pen (such as a needle, a sharp pen, a ball-point pen, . . . ) approaches the touch panel, the object icon of the plurality of icons displayed on the touch panel is displayed in an expansion state based on the capacitance value between the object and the touch panel. In this case, there is a case that the icon which is not the object is displayed in the expansion state, and the operability is improved to the user.

As another technique, in JP 2006-236143A, a distance between a finger of a user and a touch panel is determined from an image showing a main display section (the touch panel) and its neighborhood and taken by a camera. When the distance is a predetermined distance, an icon is displayed on the touch panel in the expansion state. However, this technique needs the space where the camera is arranged.

Also, another technique is described in JP H08-212005A and JP H11-065769A, in which a distance detection mechanism emitting light is arranged around the touch panel. For example, when the light is interrupted at a position near the touch panel after light is interrupted at a position far from the touch panel, an icon is displayed on the touch panel in an expansion state. However, in this technique, because the distance detection mechanism is arranged around the touch panel, the depth would be provided to the touch panel.

Also, another technique is described in JP 2007-004660A and JP H05-046308a, in which an icon and a key are displayed in the expansion state in a size according to the size of a finger when the finger touches a touch panel.

CITATION LIST

[Patent Literature 1] JP 2009-86612A
[Patent Literature 2] JP 2006-236143A
[Patent Literature 3] JP H08-212005A
[Patent Literature 4] JP H11-065769A
[Patent Literature 5] JP 2007-004660A
[Patent Literature 6] JP H05-046308A

SUMMARY OF THE INVENTION

The present invention provides a mobile terminal in which a malfunction is prevents and the improvement of operability can be attempted.

A mobile terminal of the present invention is provided with a touch panel of a capacitance type, a display control section, a capacitance measuring section, a distance determining section, a distribution data generating section and a storage section. A plurality of transparent electrodes are arranged in the touch panel to show coordinates. The display control section displays a plurality of icons which can be selected by a user, on the touch panel. The capacitance measuring section periodically measures a capacitance value of each of a plurality of capacitances which are formed between the plurality of transparent electrodes and a finger of the user as a counter electrode. The coordinate determining section determines an estimation coordinate showing an estimation position of the finger based on the capacitance values and the coordinates corresponding to the plurality of transparent electrodes. The distance determining section calculates an estimation distance showing a distance between the touch panel and the finger based on a selection capacitance value, which has the maximum capacitance value, of the capacitance values. The distribution data generating section generates data showing a distribution of the measured capacitance values as capacitance distribution data. The storage section stores set capacitance distribution data showing a distribution of a plurality of capacitance values set every distance between the finger position and the touch panel. The display control section displays the plurality of icons in a basic size when data similar to the capacitance distribution data does not exist in the set capacitance distribution data stored in the storage section. The display control section select as a candidate icon, one which is arranged in the estimation coordinate, of the plurality of icons displayed on the touch panel and controls the touch panel to display the selection icon in a selection size which is larger than the basic size, when the data similar to the capacitance distribution data exists in the set capacitance distribution data stored in the storage section.

According to the mobile terminal of the present invention, because the icon is displayed on the touch panel in the expansion state when detecting that the finger of the user is approaching the touch panel, the malfunction can be prevented and the improvement of operability can be attempted to the user.

BRIEF DESCRIPTION OF THE DRAWINGS

The objects, the effect, and the features of the present invention would be made clear from the description of the exemplary embodiments in conjunction with the attached drawings.

DESCRIPTION OF EXEMPLARY EMBODIMENTS

Hereafter, exemplary embodiments of the present invention will be described in detail with reference to the attached drawings.

First Exemplary Embodiment

Figure 1:
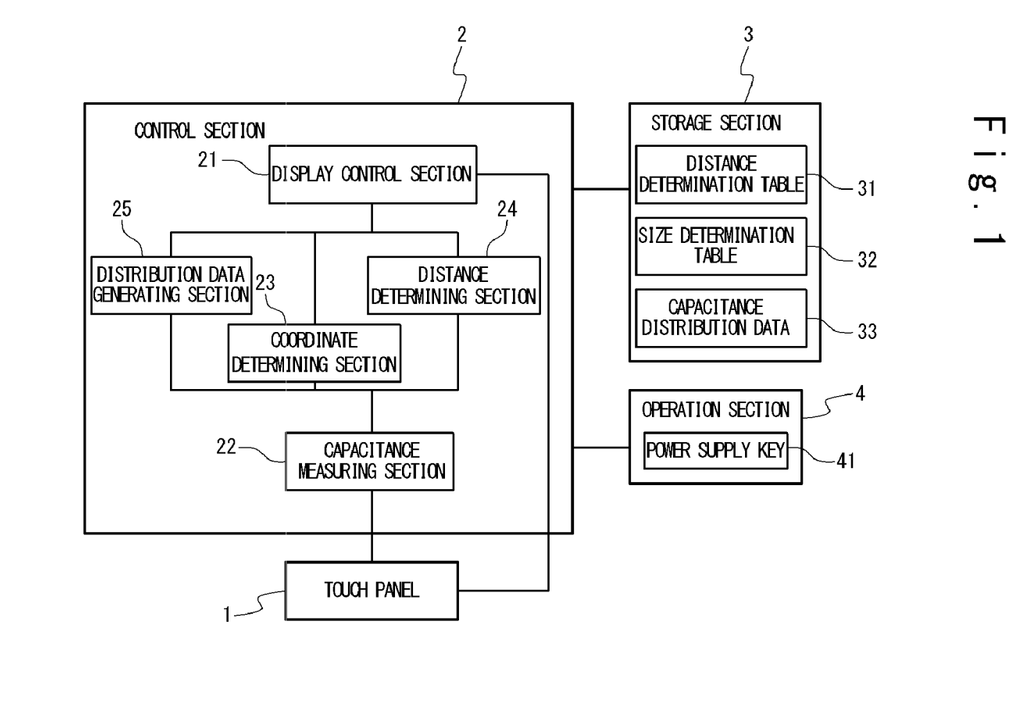
FIG. 1 is a block diagram showing a configuration of a mobile terminal according to a first exemplary embodiment of the present invention.

FIG. 1 is a block diagram showing a configuration of a mobile terminal according to a first exemplary embodiment of the present invention. The mobile terminal according to the first exemplary embodiment of the present invention is a portable type computer and is provided with a touch panel 1 of a capacitance type, a control section 2, a storage section 3 and an operation section 4. The touch panel 1 is an input/output unit from which data can be inputted by touching a screen while displaying letters, diagrams and so on, and displays a plurality of icons which are selectable by a user. The control section 2 takes various data therein from the storage section 3 by and stores a processed result in the storage section 3.

As the control section 2, a CPU (Central Processing Unit) is exemplified and as the storage section 3, a memory such as a storage medium is exemplified. A computer program executed by a computer is stored in the storage section 3. The control section 2 reads the computer program from the storage section 3 to execute it. Also, the control section 2 is provided with a display control section 21 which controls the touch panel 1 to display a plurality of icons which can be selected by the user on the touch panel 1 in a basic size. The display control section 21 controls the touch panel 1 to display the contents of a desired icon among the plurality of icons which are displayed on the touch panel 1 in response to an operation of the operation section 4 by the user.

The user can operate the operation section 4 which contains necessary and minimum keys. For example, the necessary and minimum keys contain a power supply key 41 to supply power to the mobile terminal.

The mobile terminal according to the first exemplary embodiment of the present invention can select the desired icon from among the plurality of icons by the user touching the touch panel 1 with the finger. In order to realize this, the control section 2 is further provided with a capacitance measuring section 22, a coordinate determining section 23, a distance determining section 24, and a distribution data generating section 25. These operations will be described later. Also, the storage section 3 is provided with a distance determination table 31 and a size determination table 32. The contents which are stored in these tables will be described later.

Figure 2:
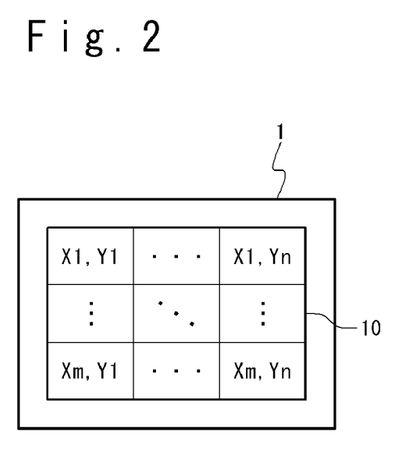
FIG. 2 shows a configuration of a part of a touch panel.

FIG. 2 shows a part of the configuration of the touch panel 1. A plurality of transparent electrodes 10 are arranged in m rows and columns on the touch panel 1 (m and n are integers equal to or more than 2). The plurality of transparent electrodes 10 show coordinates (X1,Y1) to (Xm,Yn) according to the arrangement positions.

Although being described later, the capacitance measuring section 22 measures capacitance values C(X1,Y1) to C(Xm, Yn) of a plurality of capacitances formed between the plurality of transparent electrodes 10 (X1, Y1) to (Xm, Yn) and a counter electrode. An object other than a finger (e.g. a touch pen, a needle, a sharp pen, a ball-point pen, etc.) can function as the counter electrode. However, because the finger and the object other than the finger are different in dielectric constant, the capacitance values C(X1,Y1) to C(Xm, Yn) of the capacitances to be formed are different even if they are compared at a same position (coordinate) and in a same distance. That is, a distribution of plurality of capacitance values C(X1, Y1) to C(Xm, Yn) is different.

Therefore, in the mobile terminal according to the first exemplary embodiment of the present invention, set capacitance distribution data 33 is set to show the distribution of capacitance values C(X1, Y1) to C(Xm, Yn) for every finger position (coordinate) and every distance between the touch panel 1 and the finger and is stored in the storage section 3 in advance. It is desirable that that the distribution patterns to be set are plural. Thus, only when the object being approaching the touch panel 1 is the finger of the user, the icon which is displayed on the touch panel 1 can be displayed to be expanded. This operation will be described in detail.

Figure 7:
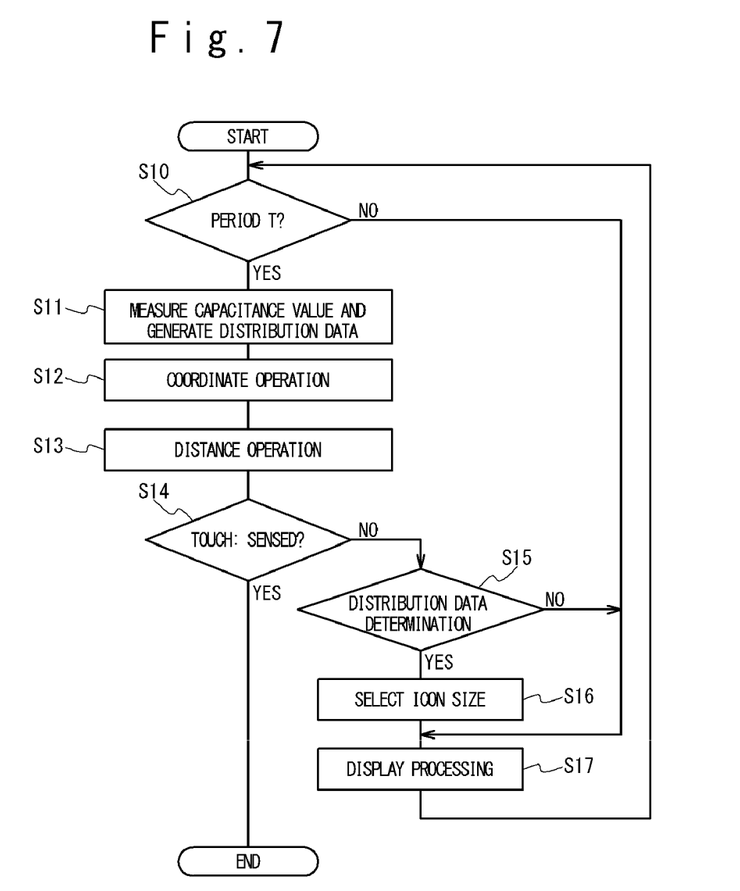
FIG. 7 is a flow chart showing the operation of the mobile terminal according to first and second exemplary embodiments of the present invention.

FIG. 7 is a flow chart showing the operation of the mobile terminal according to the first exemplary embodiment of the present invention.

As shown in FIG. 7, a process of displaying the icons in the mobile terminal is started periodically. When not meeting timing of the period start (step S10-NO), the mobile terminal executes a display process (step S17) repeatedly. When meeting the timing of the period start (Step S10-YES), the capacitance measuring section 22 is started to measure the capacitance values C(X1, Y1) to C(Xm, Yn), and the distribution data generating section 25 generates capacitance distribution data 60 (Step S11).

When the capacitance distribution data 60 is generated, the coordinate determining section 23 determines an estimation coordinate (X, Y) showing an estimated position of the finger based on the capacitance distribution data 60 (Step S12). The distance determining section 24 determines an estimation distance Dxy showing a distance between the touch panel 1 and the finger based on the capacitance distribution data 60 (Step S13).

When determining that the finger has touched the touch panel 1 (Step S14-YES), the display control section 21 executes a process after the selection under assumption of the selection of one icon. When determining (step S14-NO) that the finger has not touch the touch panel 1, the display control section 21 executes a usual displaying process or an expansion/reduction displaying process.

First, the display control section 21 determines whether or not a change of the icon size is required. When determining (step S15-NO) that it does not need the size change, the displaying process is executed without changing the size (Step S17). When determining that the size change is necessary (Step S15-YES), the display control section 21 selects the icon size (step S16) and executes the displaying process (Step S17).

Figure 3A:
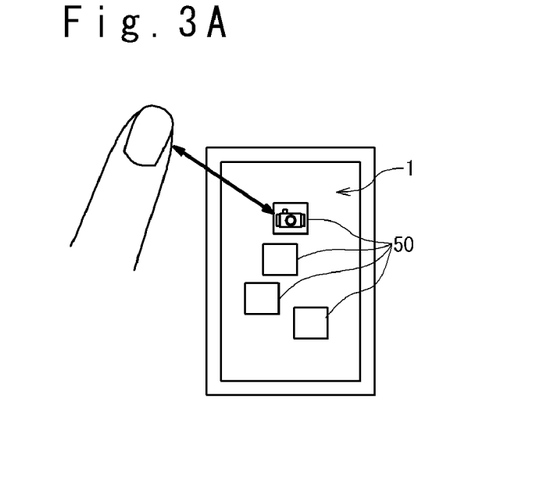
FIG. 3A is a diagram showing an operation of the mobile terminal according to the exemplary embodiment of the present invention.

Specifically, being described according to the operation order of the user, first, as shown in FIG. 3A, the display control section 21 controls the touch panel 1 to display the plurality of icons 50 selectable by the user on the touch panel 1 in the basic size (Step S10-NO, Step S17).

The capacitance measuring section 22 executes a measuring process periodically. Therefore, for every period T (Step S10-YES), the capacitance measuring section 22 executes the measuring process, that is, measures the capacitance values C(X1, Y1) to C(Xm, Yn) of the capacitances formed between the plurality of transparent electrodes 10 (X1, Y1) to (Xm, Yn) and the counter electrode which is the finger of the user (Step S11).

Figure 4:
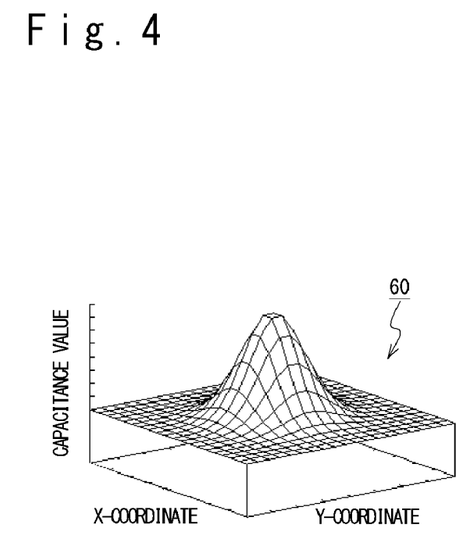
FIG. 4 shows capacitance distribution data 60 which is generated by a distribution data generating section 25 in the form of a graph.

When the measurement ends, the distribution data generating section 25 generates the capacitance distribution data 60 to show a distribution of the measured capacitance values C(X1, Y1) to C(Xm, Yn), as shown in FIG. 4. The distribution data generating section 25 stores the capacitance distribution data 60 in the storage section 3 temporarily (only for one period).

Next, the coordinate determining section 23 determines the estimation coordinate (X, Y) showing the estimated position of the finger based on the coordinates (X1, Y1) to (Xm, Yn) shown by the plurality of transparent electrodes 10 and the capacitance values C(X1, Y1) to C(Xm, Yn) (Step S12).

Here, a method of calculating the estimation coordinate (X, Y) will be described. The capacitance values in the coordinates (X1, Y1) to (Xm, Yn) shown by the plurality of transparent electrodes 10 are C(X1, Y1) to C(Xm, Yn), and the estimation coordinate (X, Y) is calculated from the following equations (1) and (2):

$$X = \frac{\sum_{i=1}^{m} Xi \times C_{(Xi,Yi)}}{\sum_{i=1}^{m} C_{(Xi,Yi)}} \qquad (1)$$

$$Y = \frac{\sum_{j=1}^{n} Yj \times C_{(Xj,Yj)}}{\sum_{j=1}^{n} C_{(Xj,Yj)}} \qquad (2)$$

The distance determining section 24 determines the estimation distance Dxy showing the distance between the touch panel 1 and the finger based on a selection capacitance value C(X, Y) which has the highest capacitance value among the capacitance values C(X1, Y1) to C(Xm, Yn) (Step S13).

Figure 5:
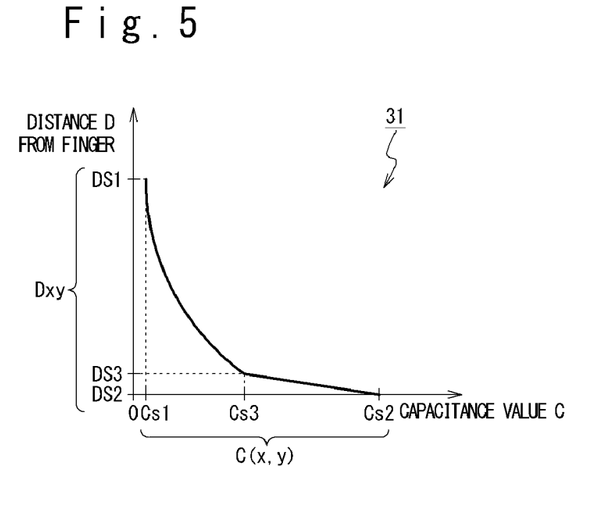
FIG. 5 shows the contents which are stored in a distance determination table 31 in the form of a graph.

Here, a method of calculating the estimation distance Dxy will be described. FIG. 5 shows the contents which are stored in the distance determination table 31 in a graph. In the distance determination table 31, the capacitance values in range from 0 [F] to the maximum set capacitance value and the distances in a range from the maximum set distance to 0 [mm] are related and are stored.

A distance, which is longer than 0 [mm] and shorter than the maximum set distance, of the distances shown by the distance determination table 31 is defined as a first set distance DS1 and the shortest distance which is 0 [mm] is defined as a second set distance DS2. Also, the capacitance value, corresponding to the first set distance DS1, of the capacitance values shown by the distance determination table 31 is defined as first capacitance value Cs1, and a maximum set capacitance value is defined as a second capacitance value Cs2. In this case, the selection capacitance value C(X, Y) meets Cs1≤C(X, Y)≤Cs2. Also, a distance immediately before the finger touches the touch panel 1 is defined as DS3 and a capacitance value at that time is defined as Cs3.

Basically, when the finger approaches the touch panel 1, the capacitance value increases. That is, in case of DS3≤Dxy≤DS1, Cs1≤C(X, Y)≤Cs3 is met. In this case, the estimation distance Dxy is calculated from Dxy=DS3×(C(X, Y)/Cs3). It should be noted that the above-mentioned equation is a linear equation but may be a non-linear equation.

Also, when the finger touches the touch panel 1, an aerial layer between the finger and the touch panel 1 is exhausted to increase the dielectric constant between the finger and the touch panel 1. The capacitance value becomes large extremely. That is, in case of DS2=0<Dxy<DS3, Cs3<C(X, Y)<Cs2 is met. In this case, the estimation distance Dxy is calculated from Dxy=DS3×(C(X, Y)−Cs2)/(Cs3−Cs2). It should be noted that the above-mentioned equation is a linear equation but may be a non-linear equation.

In this way, at step S13, the distance determining section 24 determines the distance corresponding to the selection capacitance value C(X, Y) from the distances shown by the distance determination table 31 as the estimation distance Dxy.

Next, the display control section 21 executes a usual displaying process or an expansion/reduction displaying process when the finger is not in a touch condition with the touch panel 1 (step S14-NO).

When data showing a distribution similar to the capacitance distribution data 60 does not exist in the set capacitance distribution data 33 which is stored in the storage section 3 (Step S15-NO), or when the estimation distance Dxy is longer than the first set distance DS1, the display control section 21 executes the usual displaying process. In case of the usual displaying process, the display control section 21 controls the touch panel to display a plurality of icons 50 on the touch panel 1 in the basic size (Steps S16, S17). That is, the plurality of icons 50 remains displayed on the touch panel 1 in the basic size.

Figure 3B:
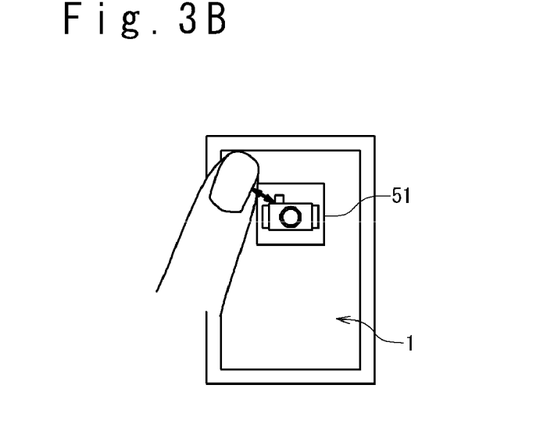
FIG. 3B is a diagram showing an operation of the mobile terminal according to the exemplary embodiment of the present invention.

The data showing the distribution similar to the capacitance distribution data 60 exists in the set capacitance distribution data 33 which is stored in the storage section 3 (Step S15-YES), and when the estimation distance Dxy is equal to or less than the first set distance DS, the display control section 21 executes the expansion/reduction displaying process. In the expansion/reduction displaying process, the display control section 21 selects the icon 50 as an object icon 51, which is displayed near the estimation coordinate (X, Y), from the plurality of icons 50 which are displayed on the touch panel 1, and displays the object icon 51 on the touch panel 1 in a selected size Axy (Steps S16, S17). The selected size Axy is a size which is in inverse proportion to the estimation distance Dxy. As shown in FIG. 3B, the selected size Axy in this case is equal to or larger than the basic size.

Figure 6:
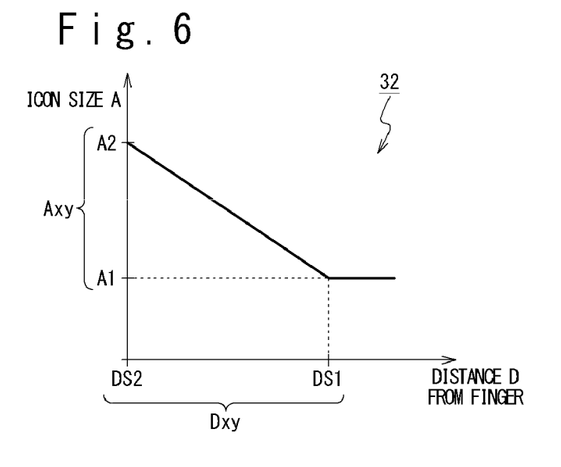
FIG. 6 shows the contents which are stored in the size determination table 32 in the form of a graph.

Here, a method of determining the selected size Axy will be described. FIG. 6 shows the contents stored in the size determination table 32 in a graph. In the size determination table 32, a size in the range from the first size A1 as the basic size to the second size A2 which is larger than the first size A1 and a distance in the range from the first set distance DS1 to the second set distance DS2 (=0 [mm]) are related and stored. FIG. 6 shows this graph.

When the distance between the finger and the touch panel 1 is longer than the first set distance DS1, the first size A1 of a reference size is applied as the size of the icon and does not need to expand. That is, in case of Dxy>DS1, the selected size Axy is shown as Axy=A1.

When the distance between the finger and the touch panel 1 is equal to or less than the first set distance DS1, that is, in case of DS2 meeting 0<Dxy≤DS1, the selected size Axy is shown as Axy=(A1−A2)×(Dxy/DS1)+A2. It should be noted that the above-mentioned equation is a linear equation but may be a non-linear equation.

In this way, in the usual displaying process, the display control section 21 refers to the size determination table 32 to select the first size A1 as the selected size Axy (Step S16), and controls the touch panel 1 to display the plurality of icons 50 on the touch panel 1 in the first size A1 (Step S17).

Also, in the expansion/reduction displaying process, the display control section 21 selects the icon 50 as an object icon 51, which is displayed near the estimation coordinate (X, Y), from the plurality of icons 50 which are displayed on the touch panel 1. The display control section 21 refers to the size determination table 32 to select the size corresponding to the estimation distance Dxy as the selected size Axy (Step S16), and controls the touch panel 1 to display the object icon 51 on the touch panel 1 in the selected size Axy (Step S17).

On the other hand, when the finger touches the touch panel 1 to select the object icon 51, the display control section 21 controls the touch panel 1 to display the contents of the object icon 51 on the touch panel 1 without executing the usual displaying process and the expansion/reduction displaying process (Step S14-YES).

In this way, in the mobile terminal according to the first exemplary embodiment of the present invention, when the finger of the user approaches the touch panel 1, the estimation coordinate (X, Y) showing the estimated position of the finger and the estimation distance Dxy showing a distance between the finger and the touch panel 1 are determined based on the capacitance value between the finger and the touch panel 1, and the capacitance distribution data 60 is generated to show a distribution of capacitance values. When the distribution condition of the capacitance distribution data 60 is similar to any of the distribution conditions which are shown by the set capacitance distribution data 33, the object icon 51, which is displayed near the estimation coordinate (X, Y), of the plurality of icons 50 which are displayed on the touch panel 1 is displayed on the touch panel 1 in a size larger than the basic size (first size A1), and in the size which is in inverse proportion to the estimation distance Dxy. That is, when the distance between the finger and the touch panel 1 is longer than the first set distance DS1, the object icon 51 is displayed in the reference size. When the distance between the finger and the touch panel 1 is equal to or less than the first set distance DS1, the object icon 51 is displayed in a size which is larger than the basic size.

Therefore, according to the mobile terminal according to the first exemplary embodiment of the present invention, when it is detected that the finger of the user is approaching the touch panel 1, an icon is displayed on the touch panel 1 to be expanded. Therefore, a malfunction can be prevented and the improvement of the operability can be attained to the user.

Second Exemplary Embodiment

Figure 8:
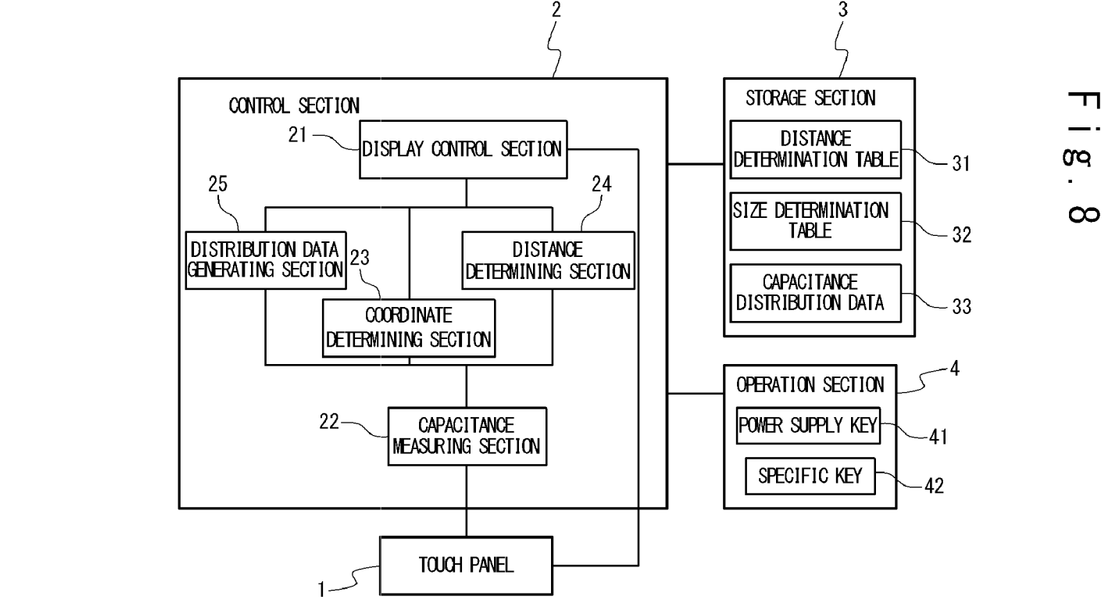
FIG. 8 is a block diagram showing the configuration of the mobile terminal according to a second exemplary embodiment of the present invention.

FIG. 8 is a block diagram showing the configuration of the mobile terminal according to a second exemplary embodiment of the present invention. In the second exemplary embodiment, the description of the same portion as that of the first exemplary embodiment is omitted.

As shown in FIG. 8, the operation section 4 of the mobile terminal according to the second exemplary embodiment contains the power supply key 41 and a specific key 42 as the necessary and minimum keys. In the second exemplary embodiment, the specific key 42 is added. The processing of the mobile terminal is substantially the same as in the first implementation, but is different in that the capacitance measuring section 22 executes a measuring process at step S11 when the user operates the specific key 42.

That is, only when the user operates the specific key 42, the capacitance measuring section 22 executes the measuring process. As a result, because an icon is displayed in the expansion state only when the user operates the specific key 42, a malfunction can be prevented. Also, because the user operates the specific key 42 at the intended timing, the mobile terminal according to the second exemplary embodiment of the present invention can attempt a low power consumption amount, compared with the mobile terminal according to the first exemplary embodiment.

Third Exemplary Embodiment

Figure 9:
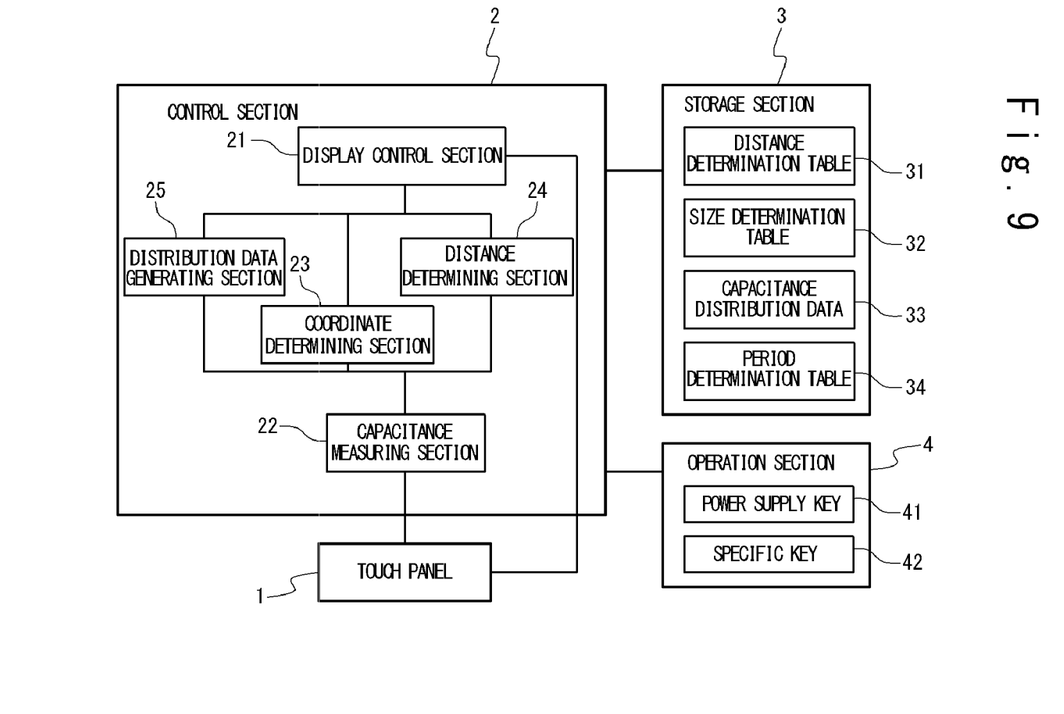
FIG. 9 is a block diagram showing the configuration of the mobile terminal according to a third exemplary embodiment of the present invention.

FIG. 9 is a block diagram showing the configuration of the mobile terminal according to a third exemplary embodiment of the present invention. In the third exemplary embodiment, the description of the same portion as those of the first and second exemplary embodiments is omitted.

Moreover, the storage section 3 of the mobile terminal according to the third exemplary embodiment is provided with a period determination table 34. The period determination table 34 is used when the period to measure a capacitance value is to be determined.

Figure 10:
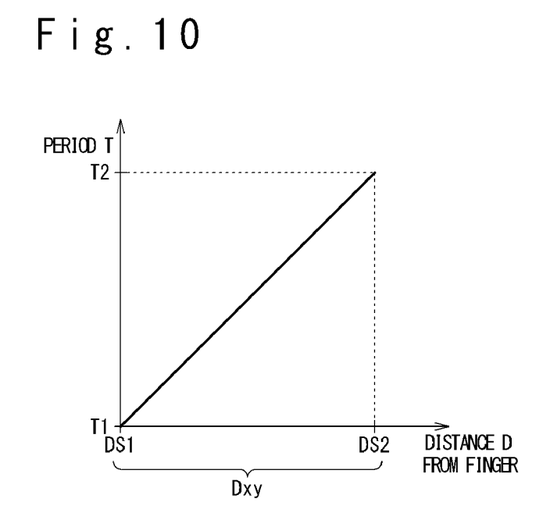
FIG. 10 shows the contents of a period determination table 34 in the form of a graph.

FIG. 10 shows the contents stored in the period determination table 34 in the form of a graph. In the period determination table 34, a distance in a range from the first set distance DS1 to the second set distance DS2 and a period in a range from a first period T1 which is a fundamental period to a second period T2 which is shorter than the first period T1 are related and stored.

Figure 11:
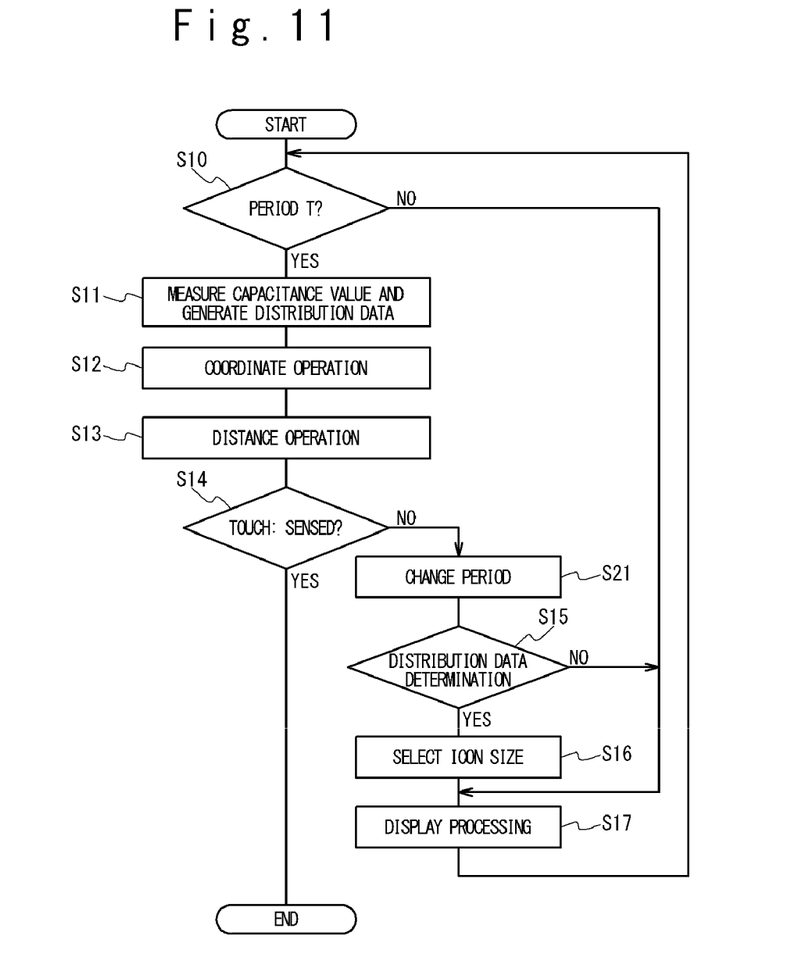
FIG. 11 is a flow chart showing the operation of the mobile terminal according to the third exemplary embodiment of the present invention.

FIG. 11 is a flow chart showing the operation of the mobile terminal according to the third exemplary embodiment of the present invention. A step S21 of changing the period is added, compared with the first exemplary embodiment.

Therefore, the capacitance measuring section 22 executes a period changing process when the finger is not in the touch condition with the touch panel 1 (step S14-NO). When the estimation distance Dxy is longer than the first set distance DS1, the capacitance measuring section 22 refers to the period determination table 34 to select the first period T1 as the period T corresponding to the estimation distance Dxy (Step S21). After that, the usual displaying process or the expansion/reduction displaying process (steps S15, S16, S17) is executed like the first and second exemplary embodiments. In this case, the capacitance measuring section 22 executes the measuring process when the first period T1 lapses (Step S10-YES).

When the estimation distance Dxy is equal to or less than the first set distance DS1, the capacitance measuring section 22 refers to the period determination table 34 to select a selection period during the first period T1 and the second period T2 as the period T corresponding to the estimation distance Dxy (Step S21). After that, the usual displaying process or the expansion/reduction displaying process (steps S15, S16, S17) is executed, like the first and second exemplary embodiments. In this case, the capacitance measuring section 22 executes the measuring process when the selection period lapses (Step S10-YES).

In this way, in the mobile terminal according to the third exemplary embodiment of the present invention, when a distance between the finger and the touch panel 1 is longer than the first set distance DS1, the capacitance measuring section 22 executes the measuring process in the reference period. When the distance between the finger and the touch panel 1 is equal to or less than the first set distance DS1, the capacitance measuring section 22 executes the measuring process in the selection period. Therefore, the operability is further improved.

In the mobile terminal of the present invention, when the finger of the user approaches a the touch panel, the estimation coordinate showing the estimated position of the finger and the estimation distance showing a distance between the finger and the touch panel are calculated based on the capacitance values between the finger and the touch panel, and the capacitance distribution data showing the distribution of the capacitance values is generated. When a distribution condition shown by the capacitance distribution data is similar to the distribution condition shown by the set capacitance distribution data, an object icon, which is displayed near the estimation coordinate, of the plurality of icons which are displayed on the touch panel, is displayed on the touch panel in a size which is larger than the basic size and which is in inverse proportion to the estimation distance. In this way, according to the mobile terminal of the present invention, when detecting that the finger of the user approaches the touch panel, the icon which is displayed on the touch panel is displayed in the expanded condition. Therefore, a malfunction can be prevented and the improvement of the operability can be attained to the user.

As described above, the present invention has been described with reference to the exemplary embodiments, but the above exemplary embodiments may be combined as far as there is not contradiction. Also, the present invention is not limited to the above exemplary embodiments and various changes may be made for the configuration and the details of the present invention in the scope of the present invention.

This application claims a priority on convention based on Japan Patent Application number JP 2010-049420. The disclosure thereof is incorporated herein by reference.

The invention claimed is:

1. A mobile terminal comprising:
a touch panel of a capacitance type, in which a plurality of transparent electrodes are arranged in a matrix, wherein said plurality of transparent electrodes show coordinates based on the arrangement positions;
a display control section configured to control said touch panel to display on said touch panel, a plurality of icons which can be selected by a user;
a capacitance measuring section configured to periodically measure a capacitance value of each of a plurality of capacitances which are formed between said plurality of transparent electrodes and a finger of the user as a counter electrode;
a coordinate determining section configured to calculate an estimation coordinate showing a position of the counter electrode based on the capacitance values and the coordinates corresponding to said plurality of transparent electrodes;
a distance determining section configured to calculate an estimation distance showing a distance between said touch panel and the counter electrode based on a selection capacitance value, which has the maximum capacitance value, of the capacitance values;
a distribution data generating section configured to generate data showing a distribution of the measured capacitance values as capacitance distribution data; and
a storage section configured to determine data showing the distribution of the capacitance values when the counter electrode is the finger of the user, in advance in correspondence to the estimation coordinate and the estimation distance to store as set capacitance distribution data,
wherein said display control section determines whether or not the counter electrode is the finger of the said user based on the set capacitance distribution data and the capacitance distribution data, and displays the plurality of icons in a basic size when it is determined that the counter electrode is not the finger of the user, and in a selection size which is larger than the basic size when it is determined that the counter electrode is the finger of the user;
wherein said storage section further stores:
a distance determination table in which a distance between said touch panel and the counter electrode and the selection capacitance value are related to each other and stored, and
a size determination table in which a distance between said touch panel and the counter electrode and the display size of the icon are related and stored, wherein said distance determining section refers to said distance determination table to determine a distance corresponding to the selection capacitance value as the estimation distance, and wherein said display control determines that the counter electrode is not the finger of the user when the data showing the distribution similar to the distribution shown by the capacitance distribution data does not exist in the set capacitance distribution data or when the estimation distance exceeds a first distance which is preset, and that the counter electrode is the finger of the user when the data showing the distribution similar to the distribution shown by the capacitance distribution data exists in the set capacitance distribution data and when the estimation distance is equal to or less than the first distance, and refers to the size determination table to determine the display size of the icon corresponding to the estimation distance as the selection size.

2. The mobile terminal according to claim 1, wherein a relation of the distance between said touch panel and the counter electrode and the selection capacitance value, which is stored in the size determination table, meets:

Axy=A1 in case of Dxy>DS1, and
Axy=(A1−A2)×Dxy/DS1+A2 in case of 0<Dxy≤DS1,
where a predetermined first set distance is DS1, an estimation distance is Dxy, a basic size is A1, the selection size is Axy, and the maximum of the selection sizes is A2.

3. The mobile terminal according to claim 2, wherein a relation of the distance between said touch panel and the counter electrode and the selection capacitance value, which is stored in the distance determination table, meets:

DS3≤Dxy≤DS1 in case of Cs1≤C(x, y)≤Cs3, and
0<Dxy<DS3 in case of Dxy=DS3×C(x, y)/Cs3 and Cs3<C(x, y)<Cs2, and
Dxy=DS3×(C(x, y)−Cs2)/(Cs3−Cs2),
where a first capacitance value in the first set distance is Cs1, a maximum capacitance value is Cs2, and a selection capacitance value is C(x, y), a distance immediately before the finger touches said touch panel is DS3, and a capacitance value at that time is Cs3.

4. The mobile terminal according to claim 1, wherein said plurality of transparent electrodes are arranged in m rows and n columns (m and n are integers equal to or more than 2),
X and Y are calculated from the following equations (1) and (2):

$$X = \frac{\sum_{i=1}^{m} X_i \times C_{(Xi,Yi)}}{\sum_{i=1}^{m} C_{(Xi,Yi)}} \quad (1)$$

$$Y = \frac{\sum_{j=1}^{n} Y_j \times C_{(Xj,Yj)}}{\sum_{j=1}^{n} C_{(Xj,Yj)}} \quad (2)$$

where coordinates showing the positions of said plurality of transparent electrodes are (X1, Y1) to (Xm, Yn), capacitance values of capacitances formed between the counter electrode and said plurality of transparent electrodes are C(X1, Y1) to C(Xm, Yn), and the estimation coordinate is (X, Y).

5. The mobile terminal according to claim 1, further comprising a specific key which is operable by the user, wherein said capacitance measuring section executes the measurement when the user is operating said specific key.

6. A mobile terminal comprising:

a touch panel of a capacitance type, in which a plurality of transparent electrodes are arranged in a matrix, wherein said plurality of transparent electrodes show coordinates based on the arrangement positions;

a display control section configured to control said touch panel to display on said touch panel, a plurality of icons which can be selected by a user;

a capacitance measuring section configured to periodically measure a capacitance value of each of a plurality of capacitances which are formed between said plurality of transparent electrodes and a finger of the user as a counter electrode;

a coordinate determining section configured to calculate an estimation coordinate showing a position of the counter electrode based on the capacitance values and the coordinates corresponding to said plurality of transparent electrodes;

a distance determining section configured to calculate an estimation distance showing a distance between said touch panel and the counter electrode based on a selection capacitance value, which has the maximum capacitance value, of the capacitance values;

a distribution data generating section configured to generate data showing a distribution of the measured capacitance values as capacitance distribution data; and a storage section configured to determine data showing the distribution of the capacitance values when the counter electrode is the finger of the user, in advance in correspondence to the estimation coordinate and the estimation distance to store as set capacitance distribution data, wherein said display control section determines whether or not the counter electrode is the finger of the said user based on the set capacitance distribution data and the capacitance distribution data, and displays the plurality of icons in a basic size when it is determined that the counter electrode is not the finger of the user, and in a selection size which is larger than the basic size when it is determined that the counter electrode is the finger of the user;

wherein said display control section determines that the counter electrode is the finger of the user when data showing a distribution similar to the distribution shown by the capacitance distribution data exists in the set capacitance distribution data, and determines that the counter electrode is not the finger of the said user when the data showing the distribution similar to the distribution shown by the capacitance distribution data does not exist in the set capacitance distribution data;

wherein said storage section further stores a period determination table in which a relation of a distance between said touch panel and the counter electrode and a period of the measurement is stored, and wherein said capacitance measuring section refers to the period determination table to execute the measurement in a selection period corresponding to the estimation distance.

7. An icon display method in which an icon selectable by a user is displayed on a touch panel in a mobile terminal which comprises said touch panel in which a plurality of transparent electrodes are arranged in a matrix to show a coordinate based on a position, said icon display method comprising:

displaying a plurality of icons on said touch panel in a basic size;

periodically measuring capacitance values of a plurality of capacitances formed between the plurality of transparent electrodes and a finger of the user as a counter electrode;

calculating an estimation coordinate showing a position of the counter electrode based on a coordinate and the capacitance values shown by the plurality of transparent electrodes;

calculating an estimation distance showing a distance between said plurality of transparent electrodes and the counter electrode based on coordinates shown by said plurality of transparent electrodes and the capacitance values of the plurality of capacitances;

generating capacitance distribution data showing a distribution of the capacitance values of the plurality of capacitances;

determining the data showing the distribution of the capacitance values when the counter electrode is the finger of the user, in correspondence to the estimation coordinate and the estimation distance to store as set capacitance distribution data in a storage section in advance;

determining whether the counter electrode is the finger of the user, based on the set capacitance distribution data and the capacitance distribution data;

displaying the plurality of icons in a basic size when it is determined that the counter electrode is not the finger of the user; and displaying in a selection size which is larger than the basic size when it is determined that the counter electrode is the finger of the user;

wherein said storage section further stores:
  a distance determination table in which a distance between said touch panel and the counter electrode and a selection capacitance value, which has the maximum capacitance value of the capacitance values, are related to each other and stored, and
  a size determination table in which a distance between said touch panel and the counter electrode and the display size of the icon are related and stored, wherein said distance determination table is used to determine a distance corresponding to the selection capacitance value as the estimation distance, and wherein it is determined that that the counter electrode is not the finger of the user when the data showing the distribution similar to the distribution shown by the capacitance distribution data does not exist in the set capacitance distribution data or when the estimation distance exceeds a first distance which is preset, and that the counter electrode is the finger of the user when the data showing the distribution similar to the distribution shown by the capacitance distribution data exists in the set capacitance distribution data and when the estimation distance is equal to or less than the first distance, and the size determination table is referred to in order to determine the display size of the icon corresponding to the estimation distance as the selection size.

8. A non-transitory storage medium which stores a program code to attain an icon display method in which an icon selectable by a user is displayed on a touch panel in a mobile terminal which comprises said touch panel in which a plurality of transparent electrodes are arranged in a matrix to show a coordinate based on a position, said icon display method comprising:

displaying a plurality of icons on said touch panel in a basic size;

periodically measuring capacitance values of a plurality of capacitances formed between the plurality of transparent electrodes and a finger of the user as a counter electrode;

calculating an estimation coordinate showing a position of the counter electrode based on a coordinate and the capacitance values shown by the plurality of transparent electrodes;

calculating an estimation distance showing a distance between said plurality of transparent electrodes and the counter electrode based on coordinates shown by said plurality of transparent electrodes and the capacitance values of the plurality of capacitances;

generating capacitance distribution data showing a distribution of the capacitance values of the plurality of capacitances;

determining the data showing the distribution of the capacitance values when the counter electrode is the finger of the user, in correspondence to the estimation coordinate and the estimation distance to store as set capacitance distribution data in a storage section in advance;

determining whether the counter electrode is the finger of the user, based on the set capacitance distribution data and the capacitance distribution data;

displaying the plurality of icons in a basic size when it is determined that the counter electrode is not the finger of the user; and displaying in a selection size which is larger than the basic size when it is determined that the counter electrode is the finger of the user;

wherein said storage section further stores:
  a distance determination table in which a distance between said touch panel and the counter electrode and a selection capacitance value, which has the maximum capacitance value of the capacitance values, are related to each other and stored, and
  a size determination table in which a distance between said touch panel and the counter electrode and the display size of the icon are related and stored, wherein said distance determination table is used to determine a distance corresponding to the selection capacitance value as the estimation distance, and wherein it is determined that that the counter electrode is not the finger of the user when the data showing the distribution similar to the distribution shown by the capacitance distribution data does not exist in the set capacitance distribution data or when the estimation distance exceeds a first distance which is preset, and that the counter electrode is the finger of the user when the data showing the distribution similar to the distribution shown by the capacitance distribution data exists in the set capacitance distribution data and when the estimation distance is equal to or less than the first distance, and the size determination table is referred to in order to determine the display size of the icon corresponding to the estimation distance as the selection size.

* * * * *